Sept. 9, 1924.  
J. G. HOWARD  
ADJUSTABLE SUPPORT FOR WINDOW SHADES  
Filed Aug. 17, 1922   2 Sheets-Sheet 1
1,507,918
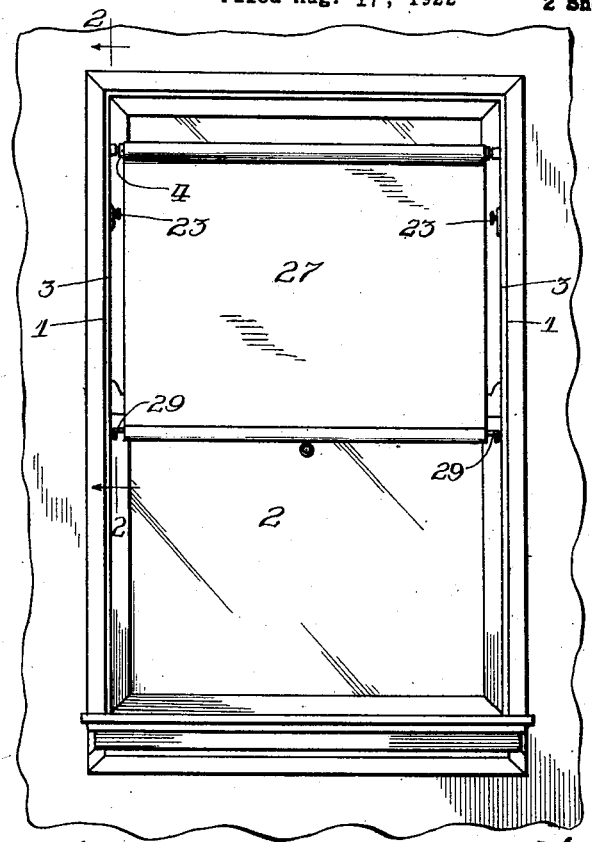
Fig.1.
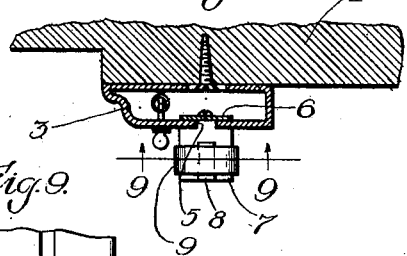
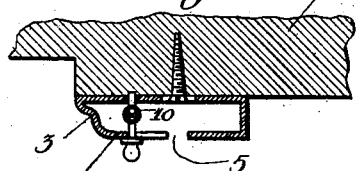
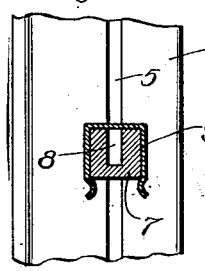
Inventor:
J. G. Howard,

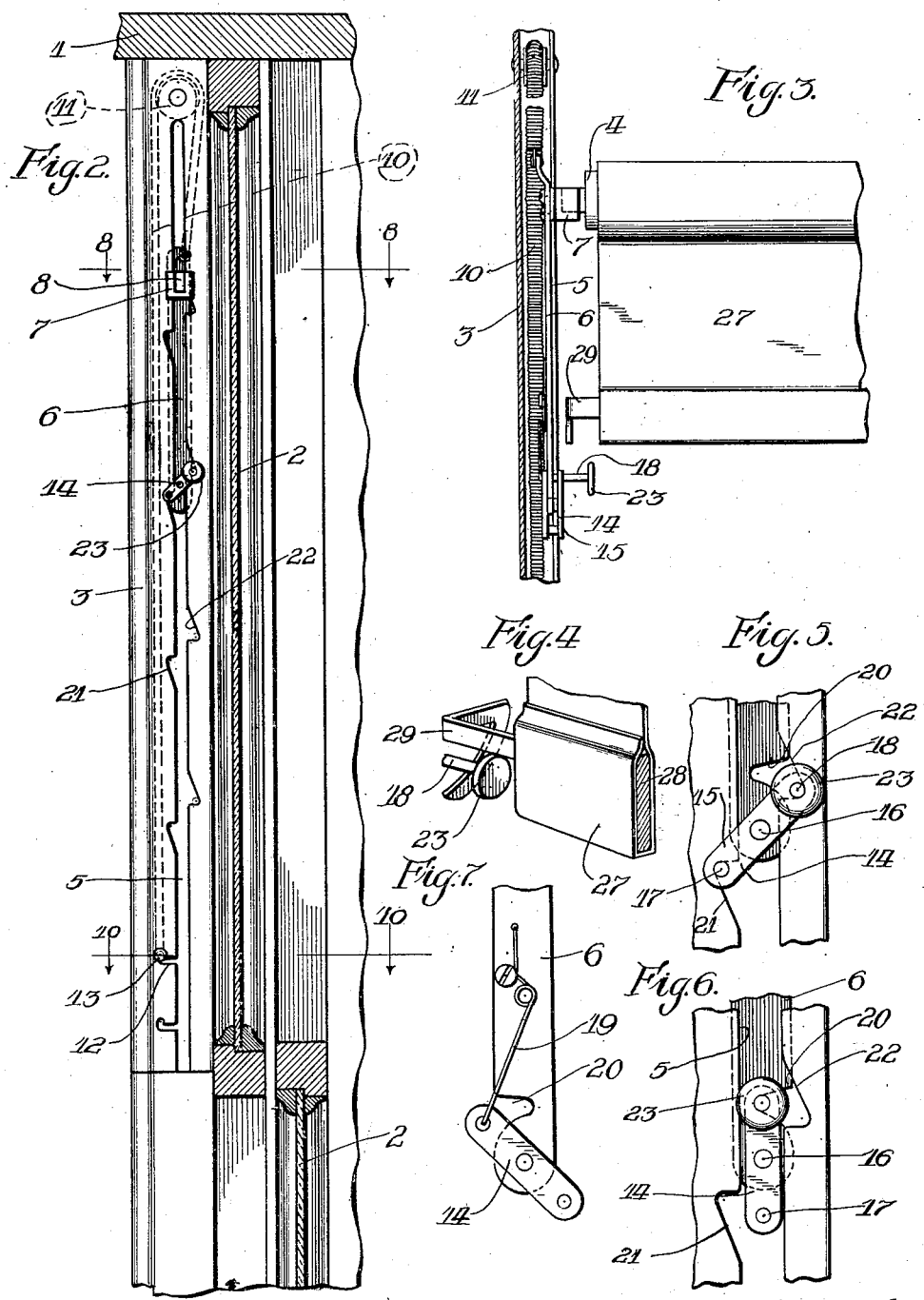

Patented Sept. 9, 1924.

1,507,918

UNITED STATES PATENT OFFICE.

JULIUS G. HOWARD, OF CHICAGO, ILLINOIS.

ADJUSTABLE SUPPORT FOR WINDOW SHADES.

Application filed August 17, 1922. Serial No. 582,338.

*To all whom it may concern:*

Be it known that I, JULIUS G. HOWARD, a citizen of Hungary, who have declared my intention of becoming a citizen of the United States of America, residing at Chicago, county of Cook, State of Illinois, have invented a certain new and useful Improvement in Adjustable Supports for Window Shades, and declare the following to be a full, clear, and exact description of the same, such as will enable others skilled in the art to which it pertains to make and use the same, reference being had to the accompanying drawings, which form a part of this specification.

It is advantageous to have window shades supported in such a way that they may be raised and lowered bodily, thus making it possible for light to enter through variable portions at the upper and lower ends of windows. The object of the present invention is to produce a simple and novel construction and arrangement for supporting window shades so as to permit them to be bodily adjusted lengthwise of windows.

In carrying out my invention I make use of supports for a shade roller acted on by long springs which tend constantly to position the shade roller at the top of the window, suitable releasable catches being provided to hold the supports in any desired lower position. All that it is necessary to do, therefore, when it is desired to raise the roller is to release the catches and permit the springs to do the work of raising; while, in order to lower the roller, the catcher may be used as handles to pull the roller down after the catches have been released. In one of its aspects, therefore, my invention may be said to have for its object to produce a simple and novel supporting means for a shade roller which will cause the roller to be automatically raised upon the release of a catch mechanism and which will permit the roller to be lowered by a downward movement on the catch mechanism after the release of the latter.

The catches on opposite sides of the window may be released in various ways, preferably by means of a cross piece connecting the same. This cross piece may be a rod lying behind the shade or it may be the shade stick. Where the catch-releasing means is the shade stick it is preferably provided at the ends with hooks which may be engaged with the catches when the shade is raised in the usual way and then act on the catches to draw them down or allow them to rise under control if it be desired to lower or raise the roller; the parts being so proportioned that the shade may be raised to carry the stick above the catches without engaging the latter, when it is desired simply to raise the shade without affecting the roller. In other of its aspects, therefore, my invention may be regarded as having for its object to produce a simple and novel shade supporting means in which the shade roller may be raised and lowered by a single cross piece or by a simple manipulation of the shade itself.

In the course of time the long suspending springs may weaken and therefore, in order that they may continue to raise the roller to the top of the window, adjustment of the springs should be made. In accordance with my invention I fasten the anchored ends of the springs in such a way that the springs may be shifted bodily to adjust them initially and also after they have been permanently stretched somewhat in service. Therefore, viewed in another of its aspects, my invention may be said to have for its object to produce a simple and novel adjusting means for a spring adapted to support and raise an end of a shade roller.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of a window equipped with a shade and supporting and controlling mechanism embodying my invention;

Fig. 2 is a section on an enlarged scale on line 2—2 of Fig. 1;

Fig. 3 is a vertical section through a portion of one of the guides on a plane parallel with the shade, a portion of the shade and shade roller being shown.

Fig. 4 is a perspective view of a fragment of the lower end of the shade, and a fragment of the corresponding catch, the hook on the end of the shade stick being shown in position to actuate the catch.

Fig. 5 is a view on a larger scale than Fig. 2 of a fragment of one of the guides and shade supports, showing the catch in locking position.

Fig. 6 is a view similar to Fig. 5, showing the catch in release position.

Fig. 7 is a view of the opposite side of the shade support from that shown in Fig. 5.

Fig. 8 is a section taken approximately on line 8—8 of Fig. 2.

Fig. 9 is a section taken approximately on line 9—9 of Fig. 8.

Fig. 10 is a section taken approximately on line 10—10 of Fig. 2.

Fig. 11 is a front view of a modified form of cross bar, shown in operative relation to the handles of the catches, which handles are shown with dotted lines; and Fig. 12 is a view similar to Figs. 8 and 10, illustrating a modified form of guide.

Referring to the drawings, 1 represents a window frame of any usual or suitable construction having window sashes 2. Instead of the vertical cleats that engage the inner of the two sashes to hold it in the frame, I provide guide bars 3. Each of these guide bars may have substantially the same external contour as any usual or suitable cleat, but it is made hollow to receive movable supporting mechanism for a shade roller 4. Each guide bar has in the side facing the other bar a slot 5 extending lengthwise through the same. Within each guide bar and movable lengthwise of the same is a plate 6 having thereon a suitable bracket 7 for supporting the adjacent end of the shade roller. The shade roller will be revolubly supported in one of the brackets, while the projection that enters the other bracket is held against rotation in any usual way. As best shown in Figs. 8 and 9 the bracket which is to prevent rotation is provided with a slot 8 cut into the top thereof, the open upper end of the slot being closed, if desired, by means of a U-shaped spring clip 9 which may be pressed in place on the bracket after the roller has been mounted. Each supporting plate is suspended on a long coiled spring 10. In order to secure a great length of spring I prefer to fasten one end of the latter to the upper end of the corresponding plate, the spring being then passed over a small wheel or pulley 11 in the upper end of the guide bar and continued down to a point near the lower end of the guide bar, where it is anchored. Provision for adjustment, both initially and after the spring has become lengthened through service, is made in the following manner: Several bayonet slots 12 are cut laterally from the main slot 5 near the lower end of the guide bar; and the lower end of the spring is provided with a headed pin 13 adapted to be received in any one of these slots. In order to anchor the lower end of the spring in place the headed pin is simply slipped laterally into one of the bayonet slots and, when the weight of the roller shade comes upon the spring, the pin is drawn upwardly into the vertical arm of the slot and held against lateral displacement.

It will be seen that when the shade roller is mounted in the brackets it is suspended by the two springs on opposite sides of the windows. The parts are so proportioned that, when free to do so, the springs raise the roller to the top of the window frame. However, when it is desired to lower the roller, it may be drawn down against the tension of the springs; but in order to hold the roller in a lowered position it must be locked in place, since otherwise the springs would raise the roller again as soon as it was released. While it may not be essential that the roller be locked against downward movement, I prefer to provide means for locking it against downward movement as well as against upward movement, so as to hold the curtain roller rigidly in place and prevent it from vibrating up and down when the shade is manipulated to roll it up or unroll it. In the arrangement shown I have pivoted on the lower end of each of the supporting plates a catch 14 in the form of a double ended pawl. This catch preferably consists of two short metal bars 15 lying on opposite sides of the supporting plate and secured thereto by means of a pivot pin 16 fastened through the centers thereof and through the lower end of the supporting plate. The two bars of the catch are fastened together at their ends by means of cross pins 17 and 18. A spring 19 arranged between the catch and the supporting plate tends constantly to hold the catch in a position more or less transverse of the plate as shown in Figs. 5 and 7. The supporting plate is provided in one edge with a notch 20 into which the cross pin 18 may swing when the catch is shifted into a position in which it extends lengthwise of the plate. In the bounding walls at opposite sides of the slot 5 are pairs of opposed notches placed at intervals along the length of the guide bar. One of the notches 21 of each pair has a downwardly facing shoulder arranged approximately at right angles to the length of the slot. The other notch 22 of each pair has an upwardly facing shoulder arranged parallel with the downward facing shoulder of the other notch. The parts are so proportioned that when the catch is brought opposite a pair of the notches as illustrated in Figs. 2 and 5, the spring 19 will cause the catch to rotate until the cross pins at the ends thereof enter the two notches. It will be seen that when the catch is in working position, engaged with a pair of notches, the supporting plate cannot be pushed down because the cross pin 18 rests on the square shoulder of the notch 22;

and the supporting plate cannot be pushed or drawn upwardly because the cross pin 17 underlies the square shoulder of the notch 21. Consequently the supporting plate is locked against either up or down movement. When it is desired to release the supporting plate so as to permit it to be moved up or down, the catch is swung from its transverse position shown in Fig. 5 to an upright position, as shown in Fig. 6, carrying it clear of the notches and permitting it to ride up and down the slot in the guide bar. The pin 18 of the catch may be extended outwardly and be provided with a head or button 23 by which it may be grasped not only for releasing the catch but for thereafter effecting or controlling the vertical movements of the supporting plate.

It is of course possible to manipulate the catches simultaneously by using both hands for this purpose, but I prefer to have some single controlling device which does not require the use of both hands. In Fig. 11 I have shown a cross rod 25 provided at its ends with notches 26 spaced apart far enough to receive the two heads or buttons on the catches lying at opposite sides of the window. This rod may be placed above the heads or buttons on the catches, receiving the latter in the notches in the ends thereof and, because the supporting plates are not very long, the rod will be concealed behind the window shade 27 in any position which the window shade will ordinarily take. The catches may therefore be released and the raising or lowering of the shade roller be controlled by means of the rod which may be actuated by means of one hand instead of two.

According to a still further development of my invention, I provide means for controlling the catches and the raising or lowering of the shade roller by the manipulation of the shade itself. As best shown in Figs. 1, 3 and 4 I provide the shade stick 28, at the lower end of the shade, with hooks 29 projecting from the ends thereof. These hooks are so shaped that when the shade is raised so as to bring the stick above the catches, the hooks will engage with the handles of the catches, that is, with the extensions of the pins 18, when the shade is drawn down. Then, by pulling outwardly on the lower end of the shade the catches will be moved into their release positions, so that the supporting plates are left free to move up or down. If the shade roller is to be raised the pull on the shade is slackened so as to permit the main supporting springs to raise the roller. If, on the other hand, it is desired to lower the roller, the shade is pulled down, carrying with it the roller supports. Whenever the roller has reached the point at which it is to be left, whether it has been moved up or down, the lower end of the shade is pushed toward the window so as to permit the catches to swing into those pairs of notches in the guide bars corresponding to the position which the roller is to occupy. The shade is then raised slowly so as to detach the hooks from the catches, and the shade may then be raised and lowered in the usual way without affecting the roller.

The guide bars may take various forms. Thus they may be made out of sheet metal as indicated in Figs. 1 to 10 or they may be in the form of wooden strips or cleats as indicated at 35 in Fig. 12, the strips or cleats having wide grooves 36 cut into the exposed broad faces, these grooves being closed by means of metal plates 37, each containing one of the slots, 5.

While I have illustrated and described with particularity only a single preferred form of my invention, with slight modifications, I do not desire to be limited to the exact structural details thus illustrated and described; but intend to cover all forms and arrangements which come within the terms employed in the definitions of my invention constituting the appended claims.

I claim:

1. In combination, a window shade, an adjustable support for the same, and cooperating means between the shade and the support for controlling the raising and lowering of said support.

2. In combination, a window shade, a support for the shade, means tending constantly to raise said support, a catch mechanism for locking the support against upward movement, and means on the shade for releasing said catch mechanism.

3. In combination, a window shade, a support for the shade, means tending constantly to raise said support, a catch mechanism for locking the support against upward movement, and a part of said shade adapted to interlock with said catch mechanism so as first to release the catch mechanism, and then lower said support when the shade is drawn down.

4. In combination, a window shade, a support for the shade, means tending constantly to raise said support, a catch mechanism for locking the support against upward movement, and a part on said shade adapted to engage the catch mechanism and release the same when a downward pull is exerted on the shade, and thus leave the support free to be moved up or down.

5. In combination, a shade roller, a shade on said roller, a support for one end of said roller, a spring from which that support is suspended, catch mechanism for locking said support in any one of a plurality of positions against the tendency of the spring to raise the support, and means on the shade for releasing said catch mechanism so as to permit said support to be raised or lowered.

6. In combination, two parallel guides, a shade roller extending between said guides, supports for the ends of said rollers, mounted in the guides, movable lengthwise of the latter, springs tending constantly to move said supports toward one end of the guides, catches on said supports, and said guides having shoulders distributed along the same in position to engage with said catches, for the purpose of locking the supports in any one of a plurality of positions against the tendency of the springs to move the supports out of said positions, a shade on said roller, and parts on said shade adapted to engage said catches to release the same.

7. In combination, two parallel guides, a shade roller arranged between said guides, supports for the ends of said roller movable along said guides, springs each attached at one end to one of said supports, and means for adjustably connecting the other end of each spring to the corresponding guide.

8. In combination, a guide, a roller support slidable along said guide, a spring tending to move said support in one direction along the guide, said guide having pairs of notches provided with oppositely-disposed working faces, and a double-ended pawl on said support in position to engage with the notches of any one pair when brought opposite the same and lock the support against movement in either direction along the guide.

9. In combination, two parallel guides, a shade roller extending between said guides, supports for said roller mounted on said guides, suspending springs for said supports, said guides having shoulders distributed along the same, catches on the said supports adapted to be interlocked with said shoulders to hold the supports against the action of the springs, a shade including a shade stick wound on the roller, and hooks on the ends of said shade stick for engaging with said catches to release the same.

10. In combination, a hollow guide, member slidable in said guide, a spring in the guide tending to move the support in one direction, said guide having an elongated slot through one of its walls, the bounding walls of said slot having pairs of oppositely-facing shoulders distributed along the same, and a double-ended pawl pivoted to said support and lying in said slot in position to engage both shoulders of any of said pairs when brought opposite the same.

In testimony whereof, I sign this specification.

JULIUS G. HOWARD.